United States Patent [19]

Kuhns et al.

[11] Patent Number: 5,224,173

[45] Date of Patent: Jun. 29, 1993

[54] METHOD OF REDUCING FRAUD IN CONNECTION WITH EMPLOYMENT, PUBLIC LICENSE APPLICATIONS, SOCIAL SECURITY, FOOD STAMPS, WELFARE OR OTHER GOVERNMENT BENEFITS

[76] Inventors: Roger J. Kuhns, Tower Rd., Lincoln, Mass. 01773; Robert L. Nathans, 36 Stag Dr., Billerica, Mass. 01821

[21] Appl. No.: 783,867

[22] Filed: Oct. 29, 1991

[51] Int. Cl.⁵ .................................... G06K 9/00
[52] U.S. Cl. ............................... 382/2; 382/4; 382/38; 340/825.34
[58] Field of Search ................... 382/2, 4, 37, 38; 340/825.33, 825.34

[56] References Cited

U.S. PATENT DOCUMENTS

| | | | |
|---|---|---|---|
| Re. 30,580 | 4/1981 | Goldman et al. | 340/825.33 |
| 4,047,154 | 9/1977 | Vitols et al. | 382/38 |
| 4,253,086 | 2/1981 | Szwarcbier | 382/4 |
| 4,315,101 | 2/1982 | Atalla | 340/825.34 |
| 4,821,118 | 4/1989 | Lafreniere | 382/4 |
| 4,832,447 | 5/1989 | Javidi | 359/561 |
| 4,961,177 | 10/1990 | Uehara | 382/2 |
| 5,040,223 | 8/1991 | Kamiya et al. | 382/38 |
| 5,105,467 | 4/1992 | Kim et al. | 382/4 |

Primary Examiner—David K. Moore
Assistant Examiner—Barry Stellrecht
Attorney, Agent, or Firm—Robert L. Nathans

[57] ABSTRACT

A current applicant for a government benefit presents a fingerprint signature to a large data bank to determine if his signature is already in the data bank, to thus indicate fraud. His fingerprint is rapidly machine correlated with the fingerprints of prior approved applicants and a number of close matches are thereafter visually examined by a human operator to definitively determine whether the current applicant's fingerprint is already in the data bank. However, a coarse biometric index (CBI) of the current applicant is first compared with all CBIs of approved applicants and only a tiny percentage of positive CBI matches result in the correlation of fingerprints and visual examination by the human operator, thereby to save huge amounts of human matching time and cost. The result is reliable and economical scanning of huge data banks such as the Social Security data base. The CBI can display facial images and eliminate fingerprints altogether if desired.

30 Claims, 5 Drawing Sheets

METHOD OF REDUCING FRAUD IN CONNECTION WITH EMPLOYMENT, PUBLIC LICENSE APPLICATIONS, SOCIAL SECURITY, FOOD STAMPS, WELFARE OR OTHER GOVERNMENT BENEFITS

BACKGROUND OF THE INVENTION

Society grants many privileges to persons living within the society. Unfortunately, many persons abuse these privileges. For example, working for an employer is a privilege. Job applicants apply for sensitive positions in banks, corporate or government installations requiring access to sensitive information, or other jobs involving positions of trust. Other privileges are extended to persons applying for drivers licenses, taxicab licenses, security guards and so forth. Many of these job or license applicants are dishonest persons who have a prior criminal or an other undesirable record and seek to perpetrate further fraud on their prospective employers or the public with whom they come in contact with.

Ideally, the society would have a central data bank (with strict safeguards to protect individual rights) where data indicating prior undesirable or criminal activity and convictions, ideally both state and federal, were stored in a manner to permit an employer or public licensing agency to verify that a current job or license applicant does not have a prior criminal record. Recently, a handgun control proposal in the U.S. Senate, called for a quick check with a national data bank of known criminals. Unfortunately, no such data bank exists. One drawback in operating such a data bank is that it would be very large and thus difficult and costly to search for the data indicating such prior criminal activity. Another problem is that dishonest applicants can assume false identities which would prevent an effective search of the data bank entirely.

A classical solution would be to record fingerprints of all persons previously arrested for a crime and search the data bank for a fingerprint match. However, such a search for one fingerprint among millions, for each of many applicants is simply too time consuming, tedious, subject to error, and thus very costly, especially when large numbers of applicants must be verified each day. Also, since such applicants often assume false identities, the far simpler and less costly matching of names and social security numbers to retrieve the derogatory background data is futile for reasons to be explained. Thus there is a need to provide a solution to this problem which is far faster and less costly than straightforward classical fingerprint matching.

Also, a habitual criminal who continues to commit crimes is not privileged to be free to continue inflicting crimes on the public. The police and the courts of course are mandated to withdraw such privilege utilizing due process of law. However, the police departments cannot use the classical fingerprint matching process, involving millions of fingerprints in an accessed data bank, on a routine basis for everyday arrests due to the use of false identities and the data processing drawbacks mentioned above. It is also highly desirable to provide a method for public licensing agencies, the police and employers to verify past records of persons in a manner which is in part compatable with their currently and previously used personal identification data base (coarse biometric data) recorded on employment forms or arrest blotters. Setting up entirely new data banks is time consuming, costly and otherwise undesirable.

A similar type of fraud involves cheating government agencies by unlawfully obtaining multiple governmental benefits. In the description to follow, we emphasize this particular type of fraud. However the techniques described herein may also be employed to solve the aforesaid problems.

One person (Mr. Double Dipper) can get twice his normal quota of food stamps by assuming a false identity and getting a duplicate U.S. social security card and new number. He then uses the second social security number and a different name and address to get a second food stamp card at a different state administrated issue station than the station that issued the first food stamp card. He then applies twice each month at two different issue stations using two different names and addresses and the two different SS numbers. With food stamps issued to a family often with $200/month this ripoff costs the government billions of dollars a year. If ten foodstamp cards are obtained, by a cheater, using nine illicit social security numbers, the ripoff by a single person amounts to $1800 per month! The U.S. Department of Argiculture, exclusive of state contributions, spent 13.75 billion dollars in fiscal 1989 for the food stamp program alone. Assuming this fraud amounts to fifteen percent, this indicates a ripoff of the food stamp program of over two billion dollars in a single year alone. Welfare benefits are subjected to like cheating.

Ideally, we should like to protect the entire social security base nationwide, since illicitly obtaining two, three or even more social security numbers permits fraud in obtaining government benefits in addition to food stamps. For example, numerous persons have been criminally prosecuted and imprisoned for fraudulently obtaining multiple pensions from the social security system by applying for duplicate social security numbers. State and federal government sponsored access to medical care, welfare and the like is also vulnerable to this type of fraud costing taxpayers many millions more.

Also, the obtaining of duplicate social security numbers creates considerable havoc throughout the country in other ways. Merchants and banks rely on drivers licenses in extending credit, which licenses are keyed to social security numbers. Thus duplicate or triplicate false drivers licenses facilitate much commercial fraud. They also enable people to drive who have had their licenses suspended for drunk driving and other offenses, and additionally permit under-age persons to purchase liquor.

The Social Security Administration has in the past advised state agencies that is data base is wide open to fraud as people can assume false identities. The social security system is vulnerable to fraud since documents such as birth certificates which are used to obtain valid social security cards, can be either counterfeited or can easily be obtained fraudulently. With such "valid" cards, government benefits other than food stamps can be illicitly obtained. As reported in PR newswire Mar. 28, 1991, 247 illegal aliens were arrested with fraudulent social security cards used to get employment, drivers licenses and social security benefits. An Assistant Secretary of the U.S. Agriculture Department recently stated that one of the challenges the Secretary of Agriculture has asked us to face is the issue of fraud in the Food Stamp Program and to do all that is required to fight fraud. She further states that were talking about people who are ripping off taxpayers. See "Food & Nutrition", U.S. Govt Printing Office, Mar. 22, 1990. As reported in PR Newswire, Feb. 27, 1991, The Subcommittee on Social Security, Committee on Ways and Means, is to call on Congress to authorize the development of a "secure" social security number.

Furthermore, the problem is worldwide. A Brazilian newspaper recently reported large scale fraud in the social security system in Brazil amounting to 5.9 billion dollars U.S. Australia has social security fraud (The Economist, Apr. 15, 1989). In the U.K. fingerprints are being considered to weed out multiple applicants for social security benefits (Financial Times Ltd, Jul. 3, 1991).

As reported in "Supermarket News", Fairchild Publications, 1990, a Maryland food stamp program proposes issuance of debit cards to all food stamp recipients who can use the cards in automatic teller machines (ATMs) to obtain cash for buying food. Proponents state that this reduces fraud. However the ATM machine cannot distinguish between a bona fide card use or the use of a second "valid" card obtained by Mr. Double Dipper as explained above. Also, the cash so obtained can be used to buy items other than food to defeat the entire purpose of the program.

In view of the foregoing, there has been a long felt need to solve this problem. Unfortunately however, the social security data base is huge and people can readily assume false identities, to obtain multiple social security numbers used to fraudulently obtain other government benefits.

SUMMARY OF PREFERRED EMBODIMENTS OF THE INVENTION

In the case of food stamps, the aforesaid problems, which are part of the invention taken as a whole, are believed solved in accordance with the invention by laser scanning, without inking, a food stamp applicant's fingerprint (FP), with a CCD TV camera and inserting the resulting refined biometric fingerprint signature into a central data bank upon issuance of his first food stamp card. When Mr. Double Dipper applies again for a second food stamp card at another issue station, he uses his second unlawfully obtained social security number rather than the first in order to attempt to get a second food stamp card. His fingerprint (FP) is again scanned and the resulting biometric fingerprint signature is forwarded to a central data bank and compared with fingerprints of all prior foodstamp applicants stored in the data bank to see if there is a match. If there is a positive match, the application for the second card may be rejected because his fingerprint was previously inserted into the data bank, thus indicating issuance of a prior food stamp card to him. The fingerprint (FP) however is not present on the food stamp card.

The methods of the invention differ from conventional biometric access control systems which can address a data bank with a personal identification number (PIN) and cause a facial image or fingerprint image to be fetched from the data bank and sent to an access control station. For example, the facial image retrieved from the data bank can be displayed on a CRT and a guard can match the displayed facial image with the face of the person seeking access. A fingerprint image fetched from the data bank can be machine matched with the fingerprint presented to the machine by the person seeking access. The prior art also teaches recording the fingerprint in an integrated circuit (IC) identification card, retrieving the fingerprint from the card and machine matching the fingerprint so retrieved with the FP presented to the machine by the person seeking access.

The problem which we are confronted with is to have a current applicant for government benefits present a refined biometric signature such as a FP to a very large data bank to determine whether the same FP is already present in the data bank. If there is a match, this shows that the current applicant is a double-dipper (or worse) since he has already applied for the benefit. One could say that we are looking for a needle in the haystack of the large data bank for an exact match to stop the double-dipper from defrauding the system. In the access control systems mentioned in the previous paragraph, the PIN goes right to the needle and fetches it out of the data bank; the bank is not scanned for a match. Likewise with respect to the IC identification card. It may also be noted that in contrast with conventional biometric access control systems, a definitive positive match here results in denial of access rather than an access granted signal.

Matching is carried out in the case of fingerprint matching by utilizing a very high speed electro-optical image correlator of the joint Fourier transform variety. However, since the data bank contains the fingerprints of many prior approved applicants for food stamp cards, it will be very large, and thus at least several close matches (false positives) for each applicant seeking benefits will generally be produced. This problem is attacked by displaying the matched refined biometric signatures, which are preferrably fingerprint (FP) images, side-by-side on a display screen for careful inspection by a human operator who makes a further decision as to whether the match between the two displayed fingerprints is definitive. Preferably, facial images of the persons matched are also displayed for further comparison by the human operator to make the match even more definitively positive. Other alpha-numeric coarse biometric data generated at the issue station, such as height, weight, age and eye color can also be displayed for each pair of persons matched by a high speed optical correlator, along with histometric data such as the applicants' name, date and place of birth and mother's maiden name. This composite display is then used by a human operator to make the final definitive decision as to whether to reject the applicant. If there is still doubt, the food stamp card is issued.

However, if the data base is very large, numerous tentatively positive close FP matches will be produced by the optical correlator, requiring numerous refined biometric signature sets of FPs and facial images to be subsequently displayed on a CRT and compared by the human operator. While hiring more operators would solve this problem, it is desired to reduce this cost. In the case where the entire social security system is to protected nationwide, having a data base of about two hundred million persons, the cost of human visual scanning-for-match times can be considerable, in the absense of the techniques described herein.

This goal of sharply reducing human visual eyeballing or visual matching (scanning-for-match times) is achieved by generating at the food stamp issue station, a coarse biometric index number for each current applicant, which is a binary number indicating a plurality of coarse biometric characteristics such as height, weight, eye color, sex and so forth, shared in common with other applicants. Right at the beginning of the matching process, the coarse biometric index of each previously approved applicant in the data bank is compared with the index of the current applicant, and if there is a mismatch, which is highly probable, further comparisons by the FP image optical correlators and by the human operators is not carried out, thereby to save very large amounts of processing time and money.

Scanning-for-match times are further reduced by recording and sorting those measured intensities of the light spot correlation peaks outputted from the optical correlators which exceed a preset threshold value, and selecting only the most intense to produce a lesser number of tentative close positive match signals for further visual cathode ray tube (CRT) screen comparison by the human operator.

Also, to reduce scanning-for-match times, a special random number spot checking routine may be used, particularly for issue stations having lesser amounts of cheating. Under suspicious circumstances, the routine is over-ridden so that the applicant is always checked. The system is easily programmed to print out the extent of cheating for each issue station which is highly useful for taking countermeasures in the most efficient manner.

Data processing times may also be reduced by matching biometric image signatures collected by issue stations located solely along bus routes which are commonly used by cheaters using multiple food stamp cards.

BRIEF DESCRIPTION OF THE DRAWINGS

Other objects, features and advantages of the present invention will become apparent upon study of the following detailed description, taken in conjunction with the drawings in which.

DETAILED DESCRIPTION OF PREFERRED EMBODIMENTS OF THE INVENTION

Figure 1:
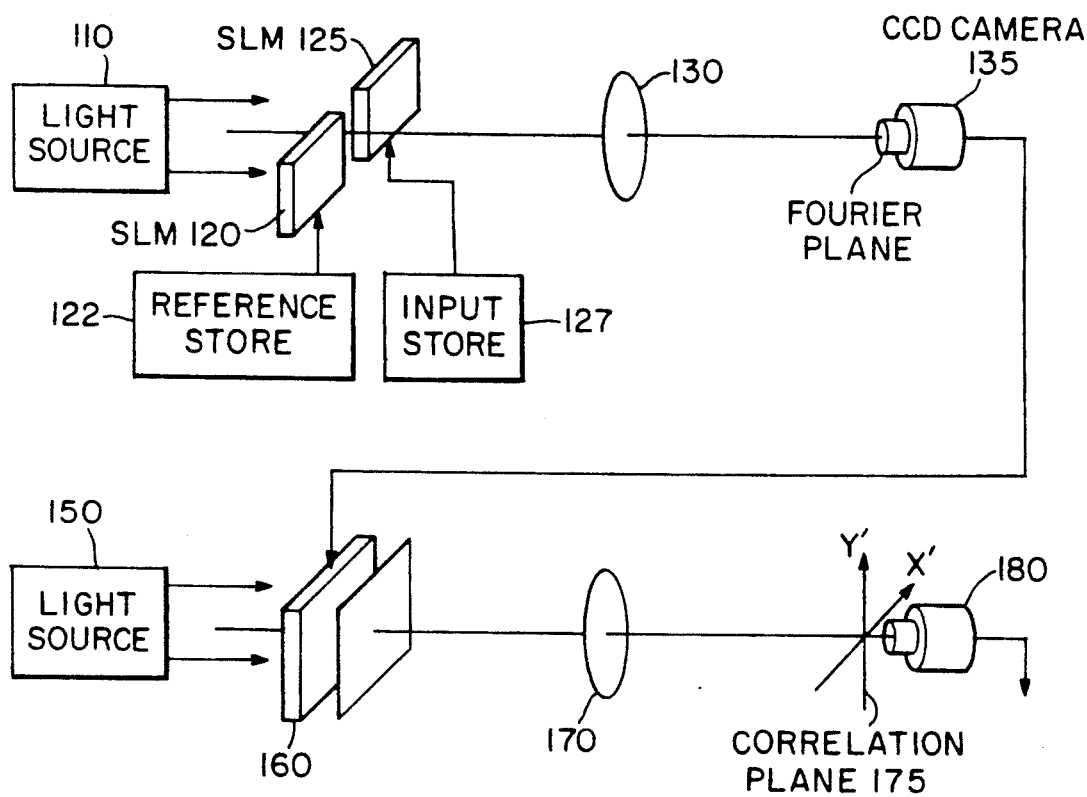
FIG. 1 illustrates a prior art Fourier transform optical correlator for fingerprint pattern matching.

While the invention may be used to verify the backgrounds or other previous undesirable past actions of applicants for various types of privileges discussed previously, or to prevent fraud in obtaining any type of government benefits, the description will focus on food stamp cards and later, on the entire national social security data base itself. There could be for example, 100 issue stations throughout the protected area which could be a state or portions of several states. When the food stamp applicant applies for a first or second card, at a food stamp issue station, he looks straight ahead into a TV vidicon camera or camcorder after removing his eyeglasses, and has facial image is recorded electronically on a magnetic or optical weekley issue station diskette. He places one or two fingers over a prism type laser finger print reader and the image of his fingerprint is electronically recorded on the weekly diskette along with has facial image and a tag data block which includes the name, address, date and place of birth, mothers name and social security number that he offers to the issue clerk. Note that inking of the fingers is not needed; such inking creates a stigma of criminality. For a further description of this type of inkless finger print scanner, see U.S. Pat. Nos. 3,174,414, 3,292,149, 3,873,970 and 4,876,725, incorporated by reference herein.

For very large data banks storing huge numbers of beneficiaries of government programs, we prefer a three tier filtering system. We first use a coarse biometric index (CBI) matching process to greatly reduce or filter out the number of comparisons to be made to find a current applicants FP which may be already in the data bank, which indicates that the current applicant is a double-dipper or cheater. One might say that we are looking for a needle in a haystack. The size of the haystack is sharply reduced by the CBI matching and is further reduced by the FP matching performed by the optical correlator of FIG. 1, and the remaining very small percentage of potential numbers of close matches are examined by a human operator visually observing the matched FP images along with the facial images associated with the matched FPs on a cathode ray tube (CRT) screen to determine if there is a definitive match.

The weekly data diskette or hard disk (store) which is created in part by a clerk keying in the tag data into an issue station PC is delivered by each issue station to the central data bank processor station covering all issue stations within the protected area. Each week the data on the weekly diskette is written into a portion of the central data bank assigned to the particular issue station. Thus each issue station store in the data bank has all of the aforesaid finger print, facial image, and textural tag data for all applicants issued cards at that particular issue station since the program started. In our one hundred issue station example, there are one hundred issue station stores which make up the major portion of the central DP data bank.

Figure 2:
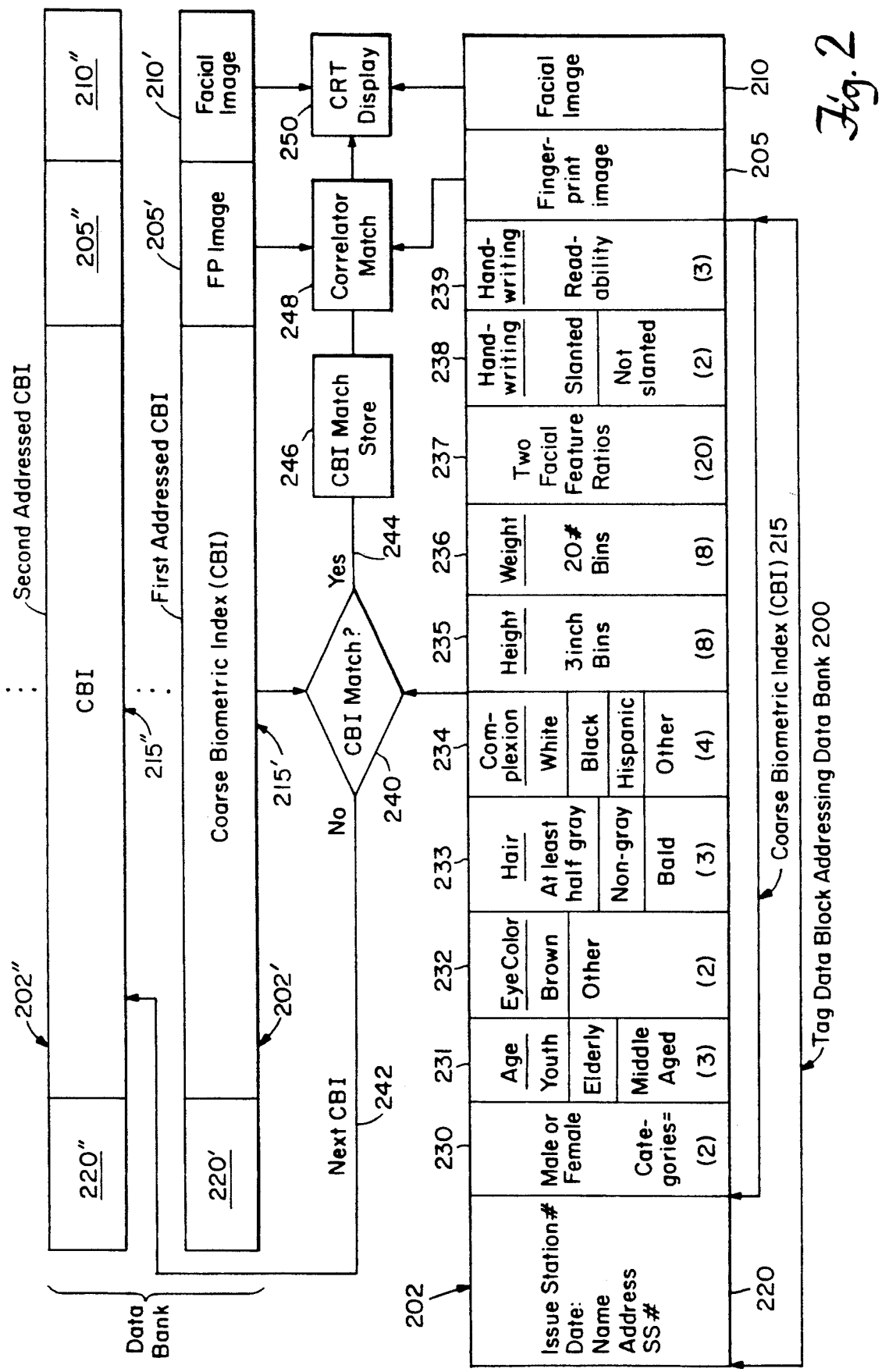
FIG. 2 illustrates sequential comparison of the data block of the current applicant with scanned addressed data blocks of previously processed applicants stored in the data bank.

As shown in FIG. 2, each current applicant data block 202 addressing the data bank comprises a tag data block 200 which is tied to or tags data representing a current applicant fingerprint (FP) image 205 and a facial image 210 each of which was video recorded at the issue station. The tag data block 200 includes a header section 220 which identifies the issue station, the week of submission of the weekley cassette to the central data process (DP), and the name, address and social security number given to the issue station clerk by the current food stamp applicant. The tag data block also includes the coarse biometric index number (CBI) of the current applicant. The refined biometric signatures 205-205' could be representations of voiceprints, facial images, palm prints, retinal or vein patterns rather than FPs, although FPs are preferred. These biometric characteristics are called "refined" since they tend to discriminate one person from the other in a more definitive manner relative to "coarse" biometric characteristics such as height or weight.

THE COARSE BIOMETRIC INDEX REDUCES HUMAN VISUAL MATCHING

The digitally recorded coarse biometric index number 215 in the tag data of the current applicant under match is sequentially compared with the digitally recorded coarse biometric index number of each prior approved applicant's data block stored and scanned in the data bank (215',215"). In the usual case, diamond 240 will rapidly and immediately fetch subsequent addressed CBIs for very high speed comparison with the addressing CBI. Digital matching of short binary numbers is very fast. If there is a positive comparison signal, which advantageously will be rare (typically one out of thousands), the optical correlator means 248 would then, and only then, compare at a later time the FPs 205 and 205' and produce at least several tentative positive close match signals for display to the human operator or processing clerk as mentioned previously. In the vast majority of cases a negative comparison signal will be produced due to the mismatching of the index of the current applicant and the index of the stored applicant. If diamond 240 indicates a CBI match at 244, CBI match store 246 will record a data block ID number from header 220 of the addressing data block and the ID of the addressed block (220') of the prior applicant which produced the CBI match. If there are say 10 such matches out of 100,000 addressed blocks sequentially scanned, ten pairs of ID numbers would be stored in the CBI match store 246. Then at a later time, the CBI store would sequentially fetch the FPs tied to those addressed data blocks which produced the CBI matches for sequential presentation to the optical correlator (248).

Thus, the input image spatial light modulator in the correlator need not be run at high speed to "keep up" with the CBI match scanning rate, and could even be run at TV scan rates. In other words, if the CBI comparison indicates a mismatch, it is improbable that there will be a correlator close match of the refined biometric FP indicia. Thus, the CBI matching process acts like a first filter to immediately reject vast numbers of candidate matches for optical machine correlation and more significantly, for subsequent human visual inspection which is time consuming and thus costly.

In FIG. 2 the coarse biometric index, which is a binary number assigned to each applicant, has the following sub-index sections:

230 is flagged (keyed in by the issue station processing clerk) to indicate whether the applicant is a male or female (two categories).

231 is flagged to indicate the approximate age of the applicant (three categories).

232 is flagged to indicate eye color (two categories).

233 is flagged to indicate hair color, at least 50% gray/not gray, or bald (three categories).

234 is flagged to indicate complexion (skin color). Note that this data is not recorded on the food stamp or social security card. It is merely observed by the issue clerk, and the data is keyed into the issue station PC and recorded on the weekley issued station diskette fowarded to the central data bank. The FP image is also not recorded on the card; (four categories).

235 is flagged to indicate eight categories or "bins" of height in three inch increments or three inch "bin" from less than 4'-10" (the first "bin") to greater than 6'-4" (the eightth "bin"). The second "bin" would be 4'-10" to 5'-1". (eight categories).

236 is flagged to indicate "bins" or eight categories of weight in twenty pound increments extending from less than 100 pounds (the first bin) to greater than 220 pounds (the eighth bin) in the case of men. Thus, the second bin would be 100 pounds-120 pounds, the third bin 121-140 pounds and so forth to define eight weight categories. The height and weight bins or categories would be different for women and the data processor at the central data bank would recognize this by the male/female flag in 230. Rather than accepting the weight given to the clerk by the applicant, we could actually weigh the currently processed applicant at the issue station, using a scale under a carpet beneath a chair and flush with the floor. It may be noted that since weights do change, this could be a source of error, creating a false negative. However, in contrast with conventional biometric access control systems, our method can tolerate some false negatives in view of the huge savings attained. The weight categories can be reduced in number to reduce this source of error or even eliminated as will be explained.

237 is flagged to indicate twenty different categories of facial feature ratios. The issue clerk could position a cursor arrow directly on the right eye pupil, then directly on the left eye pupil, and then at the center of the mouth of the current applicant's facial image captured by the CCD camera and frame-grabber and displayed in magnified form on the CRT. The cursor position could be controlled by an issue station clerk using a mouse in the conventional manner, and thus the exact distance D-1 between the eye pupils could be recorded by the PC, together with the distance D-2 between the right eye pupil and the center of the mouth. D-1 and D-2 can now be used to form a facial feature crude biometric sub-index to further expand the size and combinations of the coarse biometric (CBI) index. An additional facial feature ratio would be D-1/D-3, where D-3 is the measured distance between the bottom of the nose of the facial image on the CRT screen and the right eye pupil.

We feel intuitively that twenty categories of these facial feature ratios would produce good results. There would be four ranges or bins of D-1/D-3 ratios and five ranges or bins of D-1/D-2 ratios, yielding twenty combinations of facial feature ratios in all. Further categories could be added such as absolute distances between eye pupils and absolute distances between an eye pupil and the bottom of the nose or the center of the mouth, since all applicants can be electronically photographed in the same place at a fixed distance from the camera. Facial feature ratios are preferred since they are independent of this distance.

238 is flagged to indicate two categories of handwriting signatures. A binary one flag could indicate that the applicant's handwriting is at least somewhat slanted to the left or right and a binary two flag could indicate that the signature examined by the clerk is substantially unslanted.

239 is flagged in accordance with three categories of handwriting readability; namely definitely legible, somewhat illegible, and whether the signature is an X. The latter is widely used by millions of welfare recipients who unfortunately are unable to sign their names in the conventional manner.

By multiplying the number of categories together we find that there are about 1.1 million different possible combinations which means that the CBI matching, filters out very large numbers of FPs which would otherwise have to be examined by human operators, which is costly.

While the CBI index filtering process, without fingerprint (FP) matching, could suffice for modest sized data banks, where matched facial images only are displayed to a human operator for a definitive match, we prefer FP matching for very large data banks. The joint Fourier transform image correlator (JTC) presently preferred and disclosed in FIG. 1, is described in U.S. Pat. No. 4,832,447, incorporated by reference herein, issued to Brahams Javidi and assigned to Michigan State University.

The FP images 205 and 205' of FIG. 2 are later inserted, by use of the CBI match store 246, and only upon a relatively rare CBI positive match, into the side-by-side input spatial light modulators SLMs 120 and SLM 125 of FIG. 1, for correlation to detect close matches. Reference store 122 coupled to SLM 120 would receive in sequence FP images 205' of previously processed persons stored in the data bank whereas input store 127 coupled to SLM 125 would hold the currently processed input FP image 205 during sequential loading of FP images 205' into SLM 120.

As explained in detail in the Javidi patent, the joint power spectrum of the side-by-side images is produced by Fourier transform lens 130 and CCD camera 135 and is inserted into readout SLM 160. Inverse Fourier transform lens 170 produces the correlation light spot or peak in correlation plane 175, and CCD camera 180 at the correlation plane, measures the intensity of the output correlation light spot or peak which is produced by a moderately close FP image match as is known in the art. SLM 120 and 125 are illuminated by a lower power laser 110, while SLM 160 is illuminated by low power laser 150 to produce these results as is also well known in the art. This arrangement provides very high speed parallel optical processing of the compared images. The particular feature covered by the patent need not necessarily be utilized, as joint transform optical correlators are quite old in the art. However, the signal to noise ratios resulting from the use of the Javidi invention appear to be very attractive.

The correlator output spot light intensity of the correlation spot or peak is detected by CCD video camera 180 and electrical signals having amplitudes proportional to the light intensities are applied to threshold circuit 182 which passes those spot signals having an amplitude which exceeds a given preset threshold voltage level. The signals so passed are the correlator output signals, and their amplitudes are indicative of the degree of correlation of the closely matched FP images being compared. If there are many false positives produced by the image correlator, as indicated by the aforesaid human operator examination of the CRT displayed FPs and faces showing substantial differences between the FPs and facial images displayed side-by-side, the light intensity threshold level set by threshold circuit 182 is raised somewhat to reduce the excessive number of false positive signals. If this doesnt reduce the false positive rate enough the threshold level is raised again and the examination of the side-by-side images is repeated and so on until only a limited number of positive close match output signals are outputted from the optical correlator. In other words, the threshold level is established by adjusting that voltage level which will pass (output) an electrical CCD generated signals having amplitudes greater than the preset threshold voltage level, and which are proportional to the light intensity of the correlation bright spot. These output signals are designated as the correlator output signals. They are also designated as privilege rejection alert signals. The analog output signals from 182 are converted to digital signals via an analog to digital converter or software routine and may optionally be inserted into spot intensity store 340 to be described.

THE HUMAN OPERATOR MAKES THE FINAL MATCH DECISION

Assume there are say twenty close FP matches detected by the optical correlator to produce twenty positive close match output signals. This is quite possible since we may of compared one million FP images of previously processed persons in the data bank with the FP of the current applicant or person being presently processed. The result is that twenty sets of side by side FP and preferrably the related facial images are recorded on the positive match disk or store 350 associated with the particular issue station data being processed. The first set is retrieved from the positive match store and displayed on a CRT in a manner to electronically magnify the FP and facial images by increasing the size of the sweep field. We must be careful to eliminate false positive matches as we certainly do not wish to deprive a bona fide applicant from receiving food stamps. Thus we do not wish to rely on the machine (correlator) matching.

A human operator now carefully compares the magnified FP and facial images on the CRT display screen by "eye-balling" them, and if they are virtually identical, we can reject the applicant or subject him/here to intense scrutiny. If there is doubt, we should issue the food stamp card. No security system is perfect. The process is repeated for the remaining nineteen matches written into the positive match store. This entire process is repeated for the second, third and nth finger print on the weekley issue station diskette and later of course for the other 99 issue station weekly diskettes.

Where facial images are displayed on the CRT in addition to FPs, which is greatly preferred, the positive match output signal from the optical correlator would transfer the video recorded facial image of the currently processed applicant on the weekley issue station diskette to the positive match store and would also transfer to the positive match store the facial image of the prior applicant stored in the data base, which applicant had his FP matched with the current applicant's FP. These images are later read off of the positive match store and are displayed on the CRT screen for human operator visual comparison or "eye-balling". Another option is to display just the sets of matched faces on the screen without the FPs. This could be done where optical correlation of FPs is not performed as noted above. Note however that facial images are preferably not matched by the optical correlators since too many people look alike. Furthermore, looks change with changes in hairstyles, although the facial image recorded at the issue stations could exclude hair at the top of the head.

RECORDING DEFINITIVELY MATCHED DATA TO JUSTIFY A REJECTION, ARREST AND POSSIBLE CRIMINAL PROSECUTION

When the human operator makes a final definitive positive match decision based on the CRT display, the side-by-side matched FPs and facial images are recorded in a reject store assigned to each issue station for use in justifying rejecting the application for a second food stamp card and optionally, for use as clear evidence of possible criminal prosecution. The aforesaid matched tag data included coarse biometric data (height, weight etc.) which may be also recorded along with the images and gives further clues as to the identity of the cheater or double-dipper. The currently processed tag data could also show for example that that the cheater used a date, place of birth, or mothers name (histormetric data) which is similar to or matches tag data presented by the prior applicant. This also could, in some cases, indicate, in addition to the more significant biometric FP and facial image matching, that the current applicant is the same as the prior previously approved applicant producing the FP image match. The FP and facial images are termed refined biometric signatures since they tend to highly discriminate between persons, relative to the coarse biometric signatures previously explained. All matched data described in this paragraph is termed a signature set.

Note that the system operates off line and the cheater applying for the second illicit food stamp card can be recalled to pick up the card in person at the issue station. In the meantime, the display of the matched signature sets now in the reject store are reviewed by the police, and the decision to arrest the cheater at the issue station can be made after careful review of this evidence before he/she appears to pick up the illicit card. His name and facial image is printed out of the reject store and posted. When the cheater now appears, he is arrested on the spot. This is advantageous since the police need not seek him out to make the arrest, which can be time consuming and even dangerous.

USING ONLY THE MOST INTENSE CORRELATOR OUTPUT SPOTS

Human eyeballing, visual comparison, or scanning-for-match times can be further reduced by recording the intensities of all correlator output spots over the predetermined intensity threshold, in an intensity store. Before insertion into the store, the analog signals would be converted into digital form by a conventional A/D conversion routine. After the selected FPs in the data bank are sequentially matched with a particular current applicant's FP pursuant to the CBI matches, the intensities in the intensity store (now in binary form) are sorted in the order of their intensity values by a conventional sorting algorithm, and only the top say 10% of the stored intensity values flag 10% of the corresponding signature sets in the positive match store for display on the CRT display screen for later "eye-ball" comparison by the human operator.

Besides reducing the human scanning for match times by 90%, this technique increases the likelihood of an early on definitive match, if a definitive match is present at all, since the highest intensity signal should in theory indicate the very closest match, and the next highest the next closest match and so on, and hence the number of human operators required would be reduced for this reason also. The intensity of the correlation light spot from the Fourier transform optical correlator is proportional to the degree of correlation of the matched FPs. Thus, it is probable that if the matched FP pairs producing the highest intensity spots do not result in a definitive match as determined by the human operator, that FP pairs producing spots of lesser intensity would not cause the operator to make a definitive positive match decision. Thus, the correlator output signals exceeding the threshold comprise a first group of close match signals, a fraction of which are selected having the highest intensity values to form a second group of close match signals which earmark the signature sets to be displayed first.

SPOT CHECKING OF APPLICANTS AT LOWER RISK ISSUE STATIONS

In accordance with a further feature of the invention, the number of side-by-side images to be compared by the human operator, and hence match times, may be further reduced by the use of an optional computer algorithms at the issue station which generates spot check flag signals for say one out of three food stamp applicants. A spot check flag signal is recorded in the tag data of an applicant and the matching process would thus be performed only in response to the presence of the spot check flag signal. This option is particularly useful for very large data banks. But an official at the food stamp issue office should not be able to predict when the spot check flag signal is generated by the PC program for the next applicant. This is because he/she can "dump out"; that is issue a second unlawful food stamp card to a friend or other co-conspirator. Fraud is often perpetrated by dishonest insider employees having access to a license issuance process.

This problem is solved by having the issue station PC generate spot check flag signals at random intervals so that the spot checks could occur in clusters during certain intervals and be widely spaced during other intervals. This pattern, since it is produced by a random number generator in the PC program, would be unknown to the issue station official. However, it is highly desirable that the spot check flag signals average out to say one out of three over a time period such as one day. The following exemplary program, written in basic, could be utilized in connection with this feature of the invention.

```
10 REM random interval timer:
12 CLS
20 RANDOMIZE TIMER
30 SP=INT(RND(1)*3)+1
40 A=A+1
42 IF A=200 THEN GOSUB 3000
50 IF SP=3 THEN GOSUB 1000 ELSE GOSUB 2000
60 GOTO 20
1000 PRINT "Y";
1100 M=M+1
1200 RETURN
2000 NM=NM+1
2010 PRINT"N";
2020 RETURN
3000 PC=M/A
3100 PRINT"Percent spot checked";PC;
3200 END
```

In accordance with a further feature of the invention, the spot check procedure is over-ridden if data keyed into the tag data by the clerks at the issue station indicates that there are suspicious circumstances in connection with a particular applicant. In this case, the applicant's tag data is flagged for matching at the central data bank regardless of whether or not the spot check signal is produced by the random number generator.

The algorithm: over-ride the spot check procedure if;

(a) the applicant's demeanor is suspicious (clerk enters DS) in the opinion of the issue station clerk; or (b) applicant states that he/she is over the age of twenty-five and has never worked (clerk enters NW); or (c) applicant gives an address which indicates he/she resides in a middle or upper income bracket town regardless of age (clerk keys in AD).

Note that algorithm steps (a), (b), and (c) at least raise the question of cheating.

Human operator scanning-for-match times can also be reduced by employing the aforesaid scanning-for-match process only in connection with those issue stations primarily, or only located adjacent major bus routes. We believe that cheaters make their monthly "rounds" to obtain duplicate food stamps by using this inexpensive yet handy mode of transportation. While the major bus routes connect major cities in a state, they do not extend to more rural areas.

Figure 3:
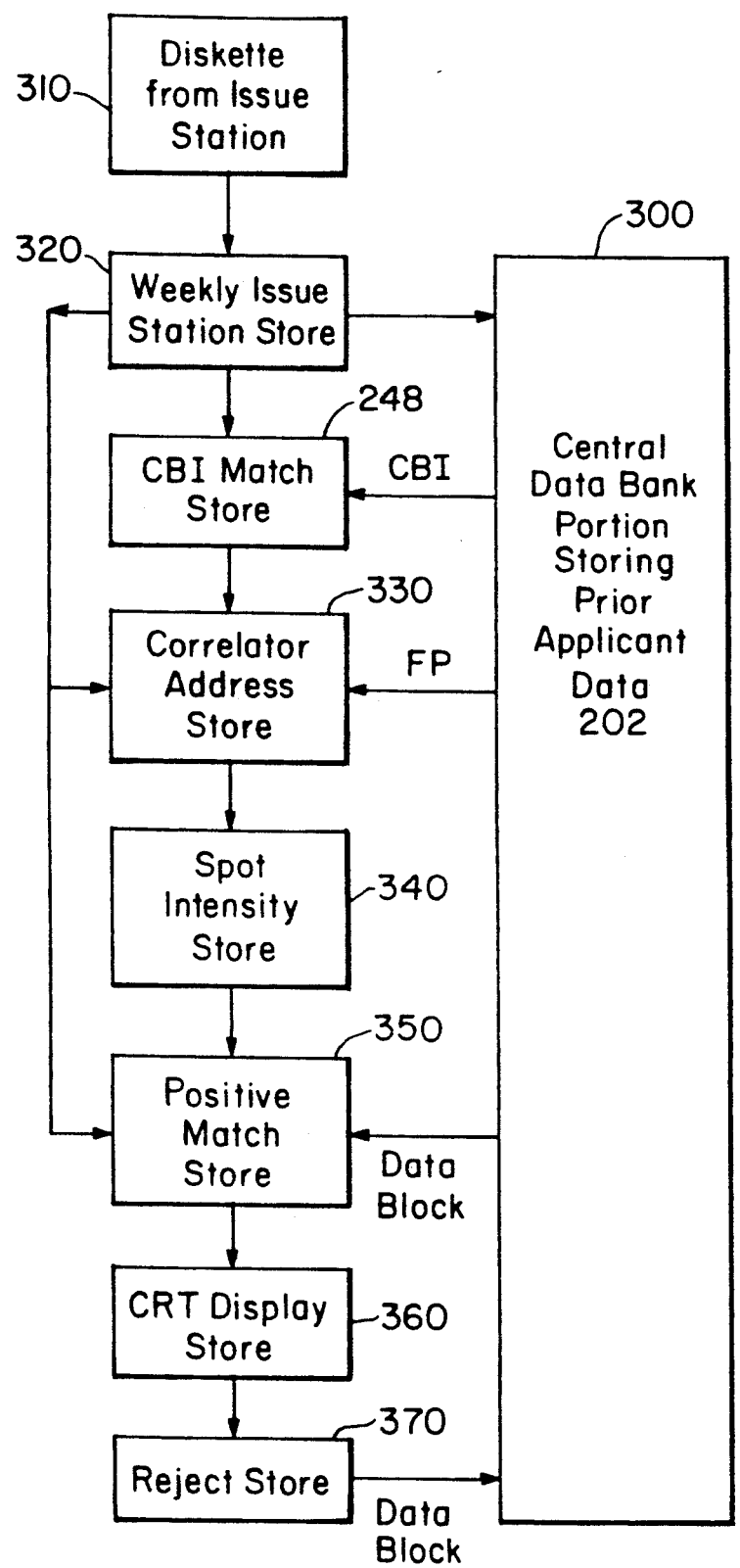
FIG. 3 schematically illustrates data bank storage devices for processing data manipulated in accordance with the invention.

FIG. 3 (not a flow chart) schematically indicates the interaction of the various central data bank storage means ancillary to the large storage bank section holding the data blocks of the prior approved applicants (previously processed persons). A weekley issue station store 320 is loaded with data from the issue station diskette 310 as previously described. Store 320 sequentially presents the addressing data blocks 202 to the data bank, and upon a rare CBI positive match, CBI match store 248 loads pairs of FPs associated with each CBI match into the side-by-side SLMs 122 and 127 of the FIG. 1 correlator for further comparison as explained above.

Any resulting electrical analog correlator output signals from CCD 180, including its threshold circuit 182, which are above the aforesaid threshold level, are digitized and inserted into the spot intensity store 340 and are sorted by a conventional sorting algorithm before the top 10% intensity signals flag the positive close matches in the positive match store 350, all as previously described. The matched data blocks so flagged are thereafter inserted into the CRT display store 360 enabling the CRT to display the side-by-side signature sets or data blocks one after the other. If the human operator determines by eyeballing that there is a definitive FP or facial image match, the pair of signature sets (data blocks 202, 202' etc. of FIG. 2) under examination are inserted into the reject store 370 for use in rejecting the applicant and perhaps arresting him.

Figure 4:
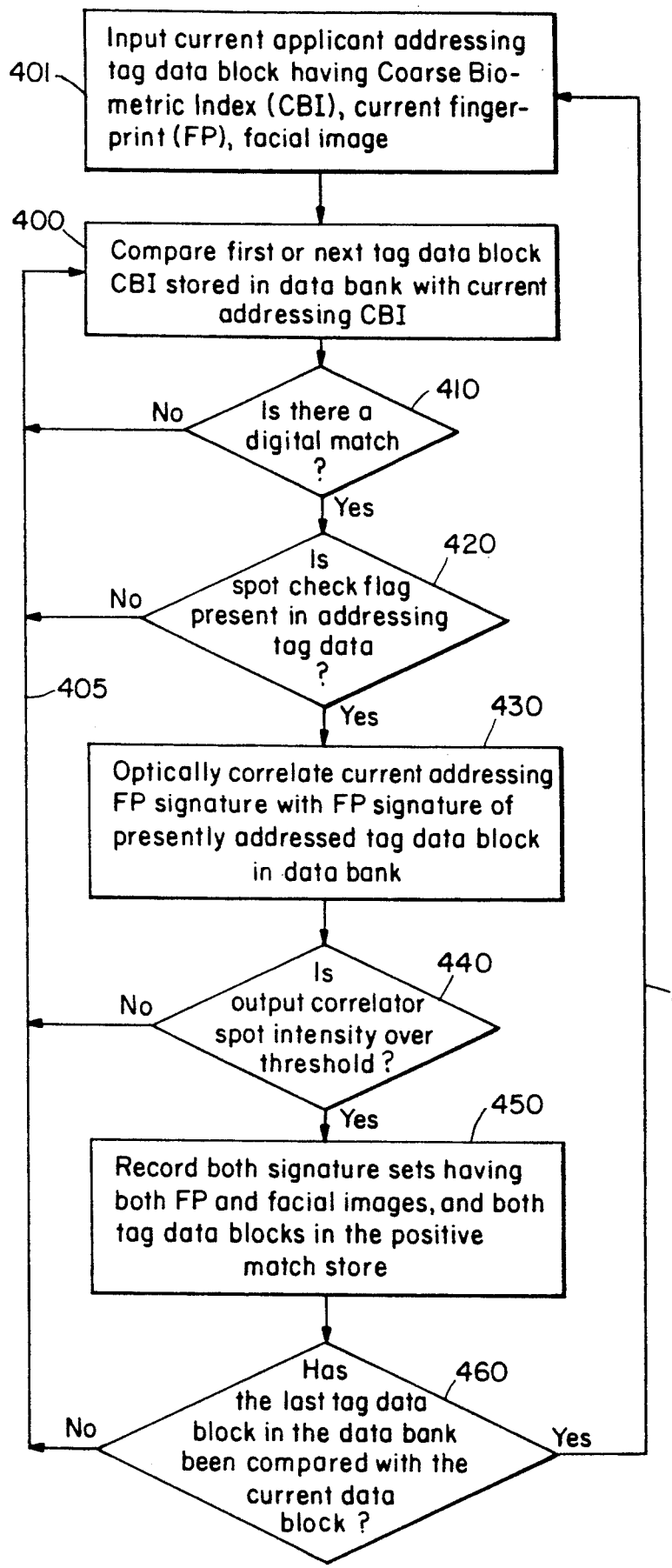
FIGS. 4 and 5 disclose flow charts useful in a further understanding of the methods of the invention.
Figure 5:
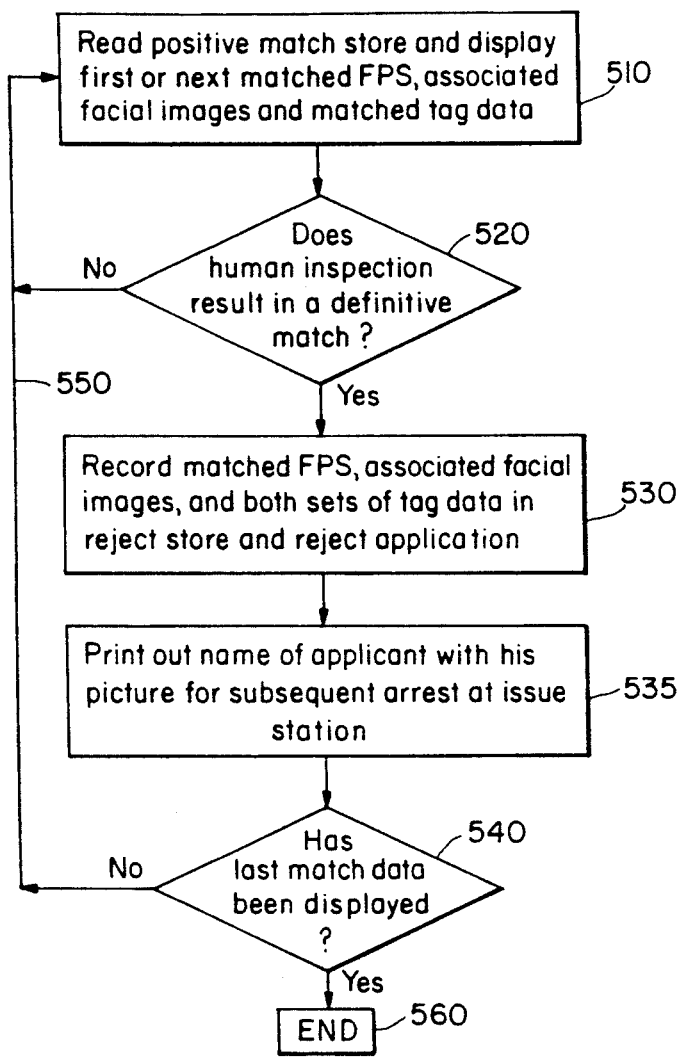

To illustrate how the aforesaid features of the invention may be utilized together, reference is now made to the flow charts of FIGS. 4 and 5. Block 400 illustrates inputting of the first (or next) current tag data block (tied to or tagging a particular current FP under examination), which sequentially addresses the numerous tag data blocks tagging the numerous FPs of previously processed persons or approved applicants stored in the central data bank. The central data processor (DP) electronically controlling the data bank compares the aforesaid crude biometric index (CBI) of the first current tag data block with the crude biometric index of the first addressed tag data block in the data bank. If there is no match (which is highly probable), diamond 410 returns a no via 405 to immediately cause the same first current tag data block CBI to address the second tag data block in the data bank. If there is no CBI match, this process repeats rapidly. If there is a CBI match this time, the current tag data block is examined at 420 for the aforesaid optional spot check flag. If it is absent, a no signal is returned to 400 via 405 to cause the first current tag data block CBI to address the "next-up" tag data block CBI in the data bank.

If the spot check flag is present this time, the current FP signature tied to the first tag data block is, for the first time, compared by the optical correlator with that FP signature associated with the presently addressed tag data block in the data bank at 430. More specifically, both FP signatures would, for the first time, be loaded into the input SLMs as explained in connection with FIG. 1. If a correlation output spot is produced which exceeds the predetermined threshold (440), the DP records the signature sets of the currently addressing and matched FPs in the positive match store for later use by the human operator (450). The pair of signature sets will produce FP and preferably facial images along with crude biometric and histometric data to be displayed to the operator as previously described. This process is repeated until all stored tag data blocks (say 100,000) are sequentially compared with the current tag data block addressing the data bank. The DP then detects the presence of the last appropriately flagged tag data block FP (diamond 460) and a yes signal will fetch the second (or next) current tag data block via 455 and 401. The aforesaid process is now repeated for the second tag data block of the second currently processed applicant addressing all 100,000 tag data blocks of the previously processed applicants stored in the data bank, in sequence as before.

After all data for all current applicants in the weekley issue station diskette have been sequentially processed as described, the aforesaid process is repeated for the second issue station weekley diskette data and so forth. In the case of 100 issue stations we would thus have 100 positive match stores 350. We now have a positive match store associated with the first issue station just processed, which is used for further visual comparison or "eye-balling" by the human operator at a convenient time. As shown in FIG. 5. The positive match store is read by the DP (510) and the matched FPs, facial images, and tag data including the coarse biometric indices (the signature sets) are displayed on the CRT screen. Recall that if the aforesaid "most intense correlator spot option" is used, only say 10% of the signature sets will be flagged for display.

If the human operator (processing clerk) determines that there is a definitive match, 520 returns a yes to cause the tag data, FP and facial image data to be recorded in the reject store (530) associated with the particular issue station being processed. If 520 returns a no signal, the next signal set in the positive match store is read and displayed on the crt (510) and so on. Decision diamond 540 returns a yes signal when the DP detects the presence of the last appropriately flagged signature set in the positive match store and the process ends at 560; else a no signal fetches the next signature set for human visual comparison via 550 and 510. Step 535 causes the name and facial image of the current applicant which produced a definitive match as determined by the human operator to be printed and posted to enable the subsequent arrest of the applicant at the issue station if desired.

SCANNING HUGE DATA BASES; THE ENTIRE SOCIAL SECURITY DATA BASE OR FBI FINGERPRINT FILES

By utilizing the aforesaid techniques, it appears economically feasible to scan huge data banks in order to attain the goals of the invention.

A key goal is to greatly reduce the required numbers of human visual comparison of fingerprints and/or facial images which would normally be called for due to the substantial numbers of close matches, owing to the huge size of these data banks. While no two fingerprints are exactly alike, many will be quite close in configuration. If the refined biometric signatures being compared were voiceprints, this would also be the case. An important feature used to attain this goal is to utilize the filtering power of the coarse biometric index (CBI) to bypass the need to employ this human visual comparison to an excessive extent in scanning huge data blocks. Since relatively few persons processed by the system will have identical CBIs, the filtering power of the CBI matching process will be substantial. This is because very large numbers of CBI mismatches will be produced for each CBI match, and the system only continues on to the optical correlation and human visual comparison matching steps upon the production of a CBI match, which is relatively rare.

Recall that the CBI described in connection with FIG. 2, has eight categories of relatively coarse biometric characteristics, gathered by the clerks in the application processing offices or issue stations and keyed into the weekley issue station diskettes. The number of different CBIs that are possible is found by multiplying together the number of possible categories for each CBI sub-index (230–239 in FIG. 2). This produces a figure of 1,105,920 possible combinations ($2\times3\times2\times3\times4\times8\times8\times20\times2\times3$). However, there will be a greater number of positive CBI matches than one out of about 1.1 million because people being matched do not have physical characteristics which are evenly distributed within the categories 230–239 of FIG. 2. For example, more people will have heights and weights which are centrally positioned within the ranges of heights and weights in the manner of a bell shaped curve. Also, weights will tend to increase with increasing heights so that a very tall person having a very low weight will be rare.

Thus, in order to estimate the number of human visual comparisons required for each currently processed person under examination, we will assume the worst case situation where the people matched have the most common coarse biometric characteristics. Upon examining the coarse biometric characteristics explained in connection with FIG. 2, our rough statistical analysis indicates that the probability of a worst case match is 0.00019 positive CBI matches. Hence, there would be 19 CBI positive matches per 100,000 of attempted CBI matches of each current applicant with each 100,000 CBIs of previously processed persons addressed in the data bank.

We have been informed that the relatively large State of Ohio has about one million food stamp recipients. However there are roughly about 300,000 Ohio applicants actually processed through the issue stations, since heads of households only are processed and their dependents do not apply for the food stamps. Thus the CBI filter would seemingly call for $19\times3$ or 57 visual human matches for a 300,000 data base, using the worst case figure of 19/100,000.

However, this assumes that for every positive CBI match their will be a close match output signal from the optical correlator. This will not be so because a CBI match does not indicate that there will be a close optical correlator fingerprint match at all. In other words there is no reason why two persons having the same CBI should have FPs which are closely matched. Perhaps up to 10% of FP comparisons could produce a correlation output pulse. Using this 10% figure, this would slash the figure of 57 to no more than about 5 visual matches per current food stamp applicant for the relatively large State of Ohio. This limited visual matching would certainly be highly cost effective.

Lets say we now wish to address and search a huge data bank such as the FBI fingerprint file, and lets assume there are ten million fingerprints to be electronically searched. Our prior figure of 19/100,000 would be multiplied by 100 to initially indicate 1900 visual human comparisons to be made. Since only a small fraction of optical correlator comparisons will produce a close match correlator output pulse from threshold circuit 182 of FIG. 1, we can adjust the threshold level to output or pass 1% of the 1900. This reduces the visual comparisons called for to 19 which is acceptable. Optionally we could pass 3% with threshold circuit 182 and select the top 33% of the close match signals in the intensity store 340 to attain the 1% figure.

Using this approach, the result is to call for:

$19\times(0.01)$ or 0.19 human comparisons/100,000 in data base;

1.9 human comparisons for a one million person data base;

19 human comparisons for a ten million person data base which is acceptable for scanning the ten million person FBI file or any data bank of about ten million and there aren't too many of these.

Figure 6:
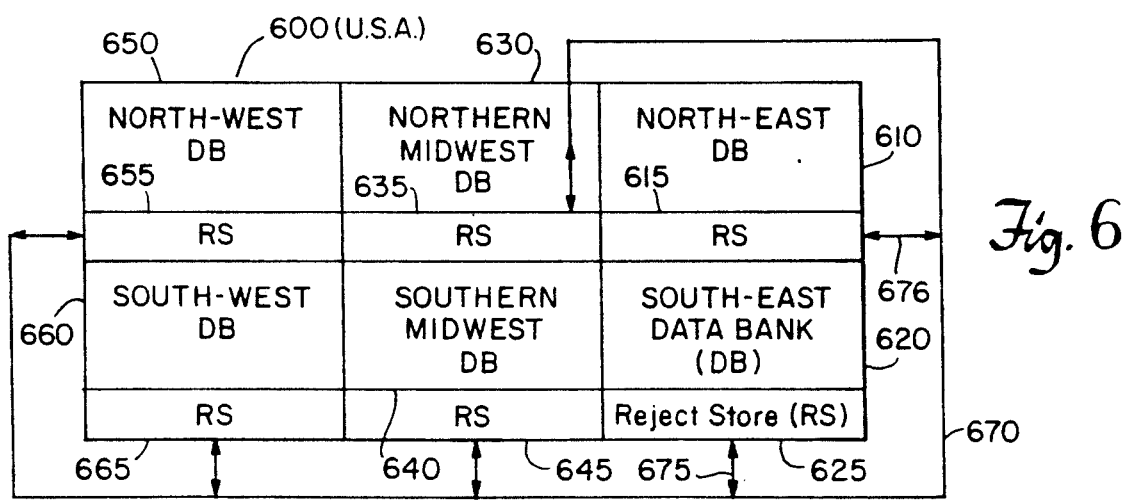
FIG. 6 schematically illustrates dividing up the nationwide Social Security system data base into subbanks for reasons to be explained.

However, when we extrapolate to attempt to protect the entire social security data base of 200,000,000 we arrive at $19\times20$ or 380 visual comparisons called for which is too much. The first way the 380 figure can be reduced is by employing the "bus route" feature where only 70% of the issue stations are processed by the aforesaid matching processes, in combination with the spot check flag feature whereby only one out of three current applicants are spot checked. This reduction factor would be 0.231 $0.7\times0.33$). Thus the adjusted reduction factor would be $380\times0.231$ or 87 human comparisons which is probably still too large. This suggests dividing the social security bank into say six zones as shown in FIG. 6. If each zone is processed independently of the other zones, we can divide 87/6 to obtain about 14 visual comparisons per zone which is acceptable. In the case of the social security system, recall that if a single cheater is prevented from obtaining even one additional illicit pension of say $14,000 per year, this saving would pay for the entire annual salary of a clerk who performs the 14 visual comparisons, day in and day out! Surely this would be highly cost effective.

Theoretically, a cheater could defeat the six zone approach by applying a second time in a different one of the six zones (sub-banks). However, since people usually stay in the same portion of the country, or move to neighboring areas, this would occur only in a minority of cases. We reduce this fraud as follows. Assume a double dipper applies for a second social security number in the southeastern zone 620 of FIG. 6, which is the same zone where he obtained the first number. His name, FP and facial image are then inserted into the aforesaid reject store 625 for the southeastern zone as previously explained. We now simultaneously write this data in all other reject stores (370 of FIG. 3) for all of the other five zones so that he will be later rejected and possibly arrested if he applies for a second social security number in any other zone. Thus, an initial recordation of the first double dip rejection into reject store 625 will cause the same rejection data to be inserted into reject stores 615, 645, 665, 655, and 635 via communication link 620. The first entry of a first rejection in any other reject store of any other zone will produce like results.

ELIMINATING FINGERPRINT MATCHING ALTOGETHER

If we eliminate fingerprint matching and the use of the optical Fourier transform correlator altogether, we could record the facial images (not FP images) of all previously processed persons in the data bank and fetch facial images of only those previously processed persons from the data bank whose CBI produce a CBI match signal with the CBI of the currently processed person addressing the data bank. The fetched facial images would be visually compared by the human operator with the recorded facial image of the currently processed person as explained. This would again call for 19 human visual comparisons of facial images per 100,000 previously processed persons scanned in the data bank. The "bus route" technique and the random spot check routine in combination could give us a further reduction to 19×0.231 or to only about 4 visual human matches per 100,000 prior applicants scanned as already explained. Hence, this technique could be useful for data banks of up to about one million or less. Not too many data banks are larger.

As mentioned earlier, the CBI matching process will produce some false negative signals where the "needle in the haystack" is missed due to a false negative CBI mismatch. This could occur if the weight of a presently processed person has changed substantially. Thus we could, for example, temporarily eliminate the weight category 236 of FIG. 2 and perhaps the hair color category of 233 since the persons hair could turn gray over a year or two. By reducing the size of the CBI index in this manner, we reduce the possible false negatives and hence increase the images to be visually compared by the human operator to enhance positive identification. Reducing the number of CBI sub-indexes effectively compared, (400-410) to increase the number of refined biometric signatures to be human eyeballed, can be selectively employed from time to time for important scans of the data bank such as matching FPs of suspects of very serious crimes where the methods of the invention are used to address the entire FBI fingerprint file. The following exemplary program fragment will be readily understood by the skilled programmer and thus need not be further explained. Obviously, the two category subroutines 140 and 150 would be supplemented by eight additional similar subroutines having additional OR statements in the case of the ten sub-index CBI example of FIG. 2.

```
10 REM Select Number of CBI sub-indexes to be
   matched: A's are addressing sub-indexes, M's are
   matched with A's.
20 INPUT"Enter 1 or 2 pairs of sub-indexes to be
   matched";NM
30 INPUT"Enter number of tests of this routine";NT
40 RANDOMIZE TIMER
50 T=T+1
60 A1=INT(RND(1)*2)+1
70 A2=INT(RND(1)*2)+1
80 M1=INT(RND(1)*2)+1
90 M2=INT(RND(1)*2)+1
100 IF NM=1 THEN GOSUB 140
110 IF NM=2 THEN GOSUB 160
120 IF T=NT THEN GOSUB 180
130 GOTO 40
140 IF A1<>M1 THEN RETURN
150 C1=C1+1:RETURN
160 IF A1<>M1 OR A2<>M2 THEN RETURN
170 C2=C2+1:RETURN
180 IF NM=2 THEN GOTO 200
190 PC=C1/T:PRINT"PC=";PC:STOP
200 PC=C2/T:PRINT "PC=";PC:END
```

While correlation of fingerprints is presently preferred due to their relative uniqueness, it is within the scope of the invention to correlate facial images. However, it is believed that the results would be less satisfactory since a greater number of facial images in a large data bank would look alike the correlators, relative to fingerprints. However, such facial image correlation may be practicable for data bases that are not too large. Again, in cases of doubt, we issue the cards. Other refined biometric signatures might be correlated such as voice-prints, retinal scans, vein matching and the like. Thus the scope of the invention is to be defined only by the terms of the following claims and art recognized equivalents thereof.

We claim:

1. A method of employing an electronically controlled data processor for determining whether a currently processed person under examination should be extended a privilege granted by society comprising the steps of:
   (a) inserting refined biometric signatures of numerous approved applicants for said privilege within said electronically controlled data processor;
   (b) producing a currently processed refined biometric signature of a current applicant for said privilege;
   (c) comparing said currently processed refined biometric signature of said current applicant for said privilege with refined biometric signatures of approved applicants stored within said data processor;
   (d) producing close match signals upon the production of a close match of said currently processed refined biometric signature with refined biometric signatures stored within said data processor;
   (e) producing tentative applicant reject signals in response to the production of said positive close match signals;
   (f) generating human recognizable representations of those closely matched refined biometric signatures which produced said tentative application reject signals for enabling comparison by a human being, thereby to tend to eliminate the effect of false positive match signals which tend to increase with large data banks, and which could result in an erroneous withholding of a privilege which could be otherwise extended to said applicant;
   (g) producing a coarse biometric index for each approved applicant, said coarse biometric index being indicative of different types of coarse biometric characteristics;
   (h) inserting coarse biometric indexes of approved applicants into said data processor;
   (i) comparing a coarse biometric index of a current applicant with numerous coarse biometric indexes of approved applicants stored within said data bank;
   (j) producing a negative comparison signal upon a mismatch resulting from executing step (i);
   (k) omitting steps (c)–(f) in response to the production of said negative comparison signal, thereby to save substantial processing labor which would otherwise be required; and
   (l) wherein the coarse biometric indexes compared in accordance with step (i) are representations of a plurality of different types of coarse biometric characteristics of persons matched, at least some of which are selected from the group consisting of sex, age, eye color, hair color, complexion, height, weight, facial feature parameters, slant of handwriting and handwriting readability.

2. The method of claim 1 wherein said coarse biometric indexes are represented by digital words, thereby to enable high speed comparisons of said coarse biometric indexes.

3. The method of claim 2 further including
(l) inserting additional facial image indicia of approved applicants into said electronically controlled data bank;
(m) generating additional facial image indicia of each current applicant;
(n) in response to the production of a tentative applicant reject signal produced in accordance with step (e), displaying to a processing clerk facial image indicia of a current applicant produced in accordance with step (m) and facial image indicia within said data bank associated with approved applicants matched with said current applicant in accordance with steps (c) and (d), thereby to further tend to eliminate false positive match signals.

4. The method of claim 1 further including
(l) inserting additional facial image indicia of approved applicants into said electronically controlled data processor;
(m) generating additional facial image indicia of each current applicant;
(n) in response to the production of a tentative applicant reject signal produced in accordance with step (e), displaying to a processing clerk facial image indicia of a current applicant produced in accordance with step (m) and facial image indicia within said data bank associated with approved applicants matched with said current applicant in accordance with steps (c) and (d), thereby to further tend to eliminate false positive match signals.

5. The method of claim 1 wherein said coarse biometric index comprises several sub-indexes and further including the step of selectively reducing the number of sub-indexes effectively compared in accordance with step (i) in order to decrease the number of coarse biometric mismatch signals to in turn increase the number of refined biometric signatures to be examined for examinations of greater importance.

6. The method of claim 1 wherein said refined biometric signatures are selected from the group consisting of fingerprints, facial images, voiceprints, palm prints, retinal patterns and vein patterns.

7. The method of claim 1 wherein step (f) includes displaying to a human operator a facial image retrieved from said electronically controlled data processor in accordance with step (e).

8. A method of employing an electronically controlled data processor for determining whether a currently processed person under examination should be extended a privilege granted by society comprising the steps of:
(a) inserting refined biometric signatures of numerous approved applicants for said privilege within said electronically controlled data processor;
(b) producing a currently processed refined biometric signature of a current applicant for said privilege;
(c) comparing said currently processed refined biometric signature of said current applicant for said privilege with refined biometric signatures of approved applicants stored within said data processor;
(d) producing close match signals upon the production of a close match of said currently processed refined biometric signature with refined biometric signatures stored within said data processor;
(e) producing tentative applicant reject signals in response to the production of said positive close match signals;
(f) generating human recognizable representations of those closely matched refined biometric signatures which produced said tentative application reject signals for enabling comparison by a human being, thereby to tend to eliminate the effect of false positive match signals which tend to increase with large data banks, and which could result in an erroneous withholding of a privilege which could be otherwise extended to said applicant;
(g) producing a coarse biometric index for each approved applicant, said coarse biometric index being indicative of different types of coarse biometric characteristics;
(h) inserting coarse biometric indexes of approved applicants into said data processor;
(i) comparing a coarse biometric index of a current applicant with numerous coarse biometric indexes of approved applicants stored within said data bank;
(j) producing a negative comparison signal upon a mismatch resulting from executing step (i);
(k) omitting steps (c)-(f) in response to the production of said negative comparison signal, thereby to save substantial processing labor which would otherwise be required; and
(l) wherein said coarse biometric index comprises several sub-indexes and further including the step of selectively reducing the number of sub-indexes effectively compared in accordance with step (i) in order to decrease the number of coarse biometric mismatch signals to in turn increase the number of refined biometric signatures to be examined for examinations of greater importance.

9. A method of employing an electronically controlled data processor for thwarting cheaters from obtaining multiple government benefits comprising the steps of:
(a) inserting refined biometric signatures of numerous approved applicants for said government benefits within said electronically controlled data processor serving a protected area including a plurality of government benefit issue stations;
(b) producing currently processed refined biometric signatures of current applicants applying for said government benefits at said plurality of issue stations within said protected area;
(c) comparing a currently processed refined biometric signature of each current applicant for said government benefits with said refined biometric signatures of numerous approved applicants stored within said electronically controlled data processor;
(d) producing close match signals upon the occurrence of a close match between each currently processed refined biometric signature with refined biometric signatures of approved applicants stored within said electronically controlled data processor;

(e) utilizing said close match signals to tentatively reject an application for said government benefits by a current applicant;

(f) recording digital words representing a coarse biometric index for each approved applicant within said data bank, said coarse biometric index being indicative of a plurality of different types of physical biometric characteristics shared in common with other approved applicants;

(g) producing a coarse biometric index of a current applicant for government benefits;

(h) comparing the coarse biometric index of said current applicant for government benefits with coarse biometric indexes of approved applicants stored within said electronically controlled data processor;

(i) producing a negative comparison signal in response to a coarse biometric index mismatch resulting from the execution of step (h); and (j) omitting steps (c)–(e) in response to the production of each negative comparison signal, thereby to save substantial application processing time which would otherwise be required; and (k) wherein said coarse biometric index comprises several sub-indexes and further including the step of selectively reducing the number of sub-indexes effectively compared in accordance with step (h) in order to decrease the number of coarse biometric mismatch signals to in turn increase the number of refined biometric signatures to be examined for examinations of greater importance.

10. A method of employing an electronically controlled data processor for thwarting cheaters from obtaining multiple government benefits comprising the steps of:

(a) inserting refined biometric signatures of numerous approved applicants for said government benefits within said electronically controlled data processor serving a protected area including a plurality of government benefit issue stations;

(b) producing currently processed refined biometric signatures of current applicants applying for said government benefits at said plurality of issue stations within said protected area;

(c) comparing a currently processed refined biometric signature of each current applicant for said government benefits with said refined biometric signatures of numerous approved applicants stored within said electronically controlled data processor;

(d) producing close match signals upon the occurrence of a close match between each currently processed refined biometric signature with refined biometric signatures of approved applicants stored within said electronically controlled data processor;

(e) utilizing said close match signals to tentatively reject an application for said government benefits by a current applicant;

(f) recording digital words representing a coarse biometric index for each approved applicant within said data bank, said coarse biometric index being indicative of a plurality of different types of physical biometric characteristics shared in common with other approved applicants;

(g) producing a coarse biometric index of a current applicant for government benefits;

(h) comparing the coarse biometric index of said current applicant for government benefits with coarse biometric indexes of approved applicants stored within said electronically controlled data processor;

(i) producing a negative comparison signal in response to a coarse biometric index mismatch resulting from the execution of step (h); and (j) omitting steps (c)–(e) in response to the production of each negative comparison signal, thereby to save substantial application processing time which would otherwise be required; and (k) further including the step of producing spot check signals at random intervals during processing of current applicants for said government benefit and causing steps (c)–(e) to be carried out only in response to a spot check signal associated with particular randomly selected current applicants, thereby to reduce processing times.

11. The method of claim 10 wherein step (k) is not carried out if data is produced at an issue station indicating that the current applicant's demeanor is suspicious or that the current applicant states that he/she is over the age of twenty-five and that he/she has never worked or that the address he/she gives indicates that he/she resides in a middle or upper income bracket town regardless of age.

12. A method of employing an electronically controlled data processor for thwarting cheaters from obtaining multiple government benefits comprising the steps of:

(a) inserting refined biometric signatures of numerous approved applicants for said government benefits within a large electronically controlled data bank serving a protected area including a plurality of government benefit issue stations;

(b) producing currently processed refined biometric signatures of current applicants applying for said government benefits at said plurality of issue stations within said protected area;

(c) comparing currently processed refined biometric signatures of current applicants for said government benefits with said refined biometric signatures of numerous approved applicants stored within said large electronically controlled data bank;

(d) producing close match signals upon the occurrence of a close match between each currently processed refined biometric signature with numerous refined biometric signatures of approved applicants stored within said data bank;

(e) utilizing said close match signals to reject an application for said government benefits by said current applicant;

(f) recording a coarse biometric index for each approved applicant within said data processor, said coarse biometric index being indicative of a plurality of different types of coarse biometric characteristics;

(g) comparing the coarse biometric index of said current applicant for government benefits with coarse biometric indexes of approved applicants stored within said data processor;

(h) producing a negative comparison signal in response to a coarse biometric mismatch resulting from the execution of step (g);

(i) omitting steps (c)–(e) in response to the production of each negative comparison signal, thereby to save application processing time which would otherwise be required;

(j) and wherein said coarse biometric index comprises several sub-indexes and further including the step of selectively reducing the number of sub-index effectively compared in accordance with step (g) in order to decrease the number of coarse biometric mismatch signals to in turn increase the number of refined biometric signatures to be examined for examinations of greater importance.

13. A method of employing an electronically controlled data processor for thwarting cheaters from obtaining multiple government benefits comprising the steps of:

(a) inserting refined biometric signatures of numerous approved applicants for said government benefits within a large electronically controlled data processor serving a protected area including a plurality of government benefit issue stations;

(b) producing currently processed refined biometric signatures of current applicants applying for said government benefits at said plurality of issue stations within said protected area;

(c) comparing currently processed refined biometric signatures of current applicants for said government benefits with said refined biometric signatures of numerous approved applicant stored within said large data electronically controlled data processor;

(d) producing close match signals upon the occurrence of a close match between each currently processed refined biometric signature with numerous refined biometric signatures of approved applicants stored within said data processor;

(e) utilizing said close match signals to reject an application for said government benefits by said current applicant; and (f) further including the step of producing spot check signals at random intervals during processing of current applicants for said government benefit and causing steps (c)-(e) to be carried out only in response to a spot check signal associated with particularly randomly selected current applicants, thereby to reduce processing times.

14. The method of claim 13 wherein step (f) is not carried out if data is produced at an issue station indicating that the current applicant's demeanor is suspicious or that the current applicant states that he is over the age of twenty five and that he has never worked or that the address he gives indicates that he resides in a middle or upper income bracket town regardless of age.

15. A method of employing an electronically controlled data processor for determining whether a currently processed person under examination should be extended a privilege granted by society comprising the steps of:

(a) recording a coarse biometric signature and a refined biometric signature for each previously processed person within a large electronically controlled data processor;

(b) transmitting to said electronically controlled data processor a currently processed coarse biometric signature and a refined biometric signature of a currently processed person;

(c) addressing said electronically controlled data processor with a coarse biometric signature of a currently processed person under examination;

(d) comparing said currently processed coarse biometric signature with numerous coarse biometric signatures of previously processed persons stored within said electronically controlled data processor and producing a coarse biometric match signal upon the detection of a coarse biometric signature match;

(e) in response to the production of a coarse biometric match signal in accordance with step (d), comparing said refined biometric signature of said currently processed person with a presently addressed refined biometric signature of a previously processed person stored in said electronically controlled data processor and producing a refined biometric signature close match signal upon the detection of a close refined biometric signature match;

(f) following the production of said refined biometric signature close match signal, generating a human recognizable representation of those refined biometric signatures which produced refined biometric signature close match signals in accordance with step (e) for enabling comparison thereof by a human being, thereby to eliminate the effect of false positive refined biometric signature match signals which tend to increase with large data banks, and which could result a rejection of said applicant who may be entitled to said privilege;

(g) should a coarse biometric positive match signal not be produced in accordance with step (d), omitting steps (e) and (f) and now comparing said currently processed coarse biometric signature with a next coarse biometric signature stored within said electronically controlled data processor of a next previously processed person, thereby to save substantial amounts of processing times;

(h) repeating steps (b)-(g) for a next currently processed coarse biometric signature of a next currently processed person; and (i) wherein said coarse biometric signature comprises several coarse biometric sub-signatures and further including the step of selectively reducing the number of sub-signatures effectively compared in accordance with step (d) in order to decrease the number of coarse biometric mismatch signals to in turn increase the number of refined biometric signatures to be examined for examinations of greater importance.

16. A method of employing an electronically controlled data processor for determining whether a currently processed person under examination should be extended a privilege granted by society comprising the steps of:

(a) recording a coarse biometric signature and a refined biometric signature for each previously processed person within a electronically controlled data processor;

(b) transmitting to said data processor a currently processed coarse biometric signature and a refined biometric signature of a currently processed person;

(c) addressing said data processor with a coarse biometric signature of a currently processed person under examination;

(d) comparing said currently processed coarse biometric signature with numerous coarse biometric signatures of previously processed persons stored within said data processor and producing a coarse biometric match signal upon the detection of a coarse biometric signature match;

(e) in response to the production of a coarse biometric match signal in accordance with step (d), comparing said refined biometric signature of said currently processed person with a presently addressed refined biometric signature of a previously processed person stored in said data processor and producing a refined biometric signature close match signal upon the detection of a close refined biometric signature match;

(f) following the production of said refined biometric signature close match signal, generating a human recognizable representation of those refined biometric signatures which produced refined biometric signature close match signals in accordance with step (e) for enabling comparison thereof by a human being, thereby to eliminate the effect of false positive refined biometric signature match signals which tend to increase with large data banks, and which could result in an erroneous rejection of said applicant;

(g) should a coarse biometric positive match signal not be produced in accordance with step (d), omitting steps (e) and (f) and now comparing said currently processed coarse biometric signature with a next coarse biometric signature stored within said data bank of a next previously processed person, thereby to save substantial amounts of processing times; and (h) repeating steps (b)-(g) for a next currently processed coarse biometric signature of a next currently processed person; and wherein the coarse biometric signatures compared in accordance with step (d) are representations of several coarse biometric characteristics of persons matched, at least some of which are selected from the group consisting of sex, age, eye color, hair color, complexion, height, weight, facial feature parameters, slant of handwriting and handwriting readability.

17. A method of employing an electronically controlled data processor for determining whether a currently processed person under examination should be extended a privilege granted by society comprising the steps of:

(a) recording a coarse biometric signature and a refined biometric signature for each previously processed person within said large electronically controlled data processor;

(b) transmitting to said data processor a currently processed coarse biometric signature and a refined biometric signature of a currently processed person;

(c) addressing said data processor with a coarse biometric signature of a currently processed person under examination;

(d) comparing said currently processed coarse biometric signature with numerous coarse biometric signatures of previously processed persons stored within said large data processor and producing a coarse biometric match signal upon the detection of a coarse biometric signature match;

(e) in response to the production of a coarse biometric match signal in accordance with step (d), comparing said refined biometric signature of said currently processed person with a presently addressed refined biometric signature of a previously processed person stored in said data processor and producing a refined biometric signature close match signal upon the detection of a close refined biometric signature match;

(f) following the production of said refined biometric signature close match signal, generating a human recognizable representation of those refined biometric signatures which produced refined biometric signature close match signals in accordance with step (e) for enabling comparison thereof by a human being, thereby to eliminate the effect of false positive refined biometric signature match signals which tend to increase with large data banks, and which could result in an erroneous rejection of said applicant;

(g) should a coarse biometric positive match signal not be produced in accordance with step (d), omitting steps (e) and (f) and now comparing said currently processed coarse biometric signature with a next coarse biometric signature stored within said data processor of a next previously processed person, thereby to save substantial amounts of processing times;

(h) repeating steps (b)-(g) for a next currently processed coarse biometric signature of a next currently processed person;

(i) and wherein said coarse biometric signatures are represented by digital words and step (d) includes comparing said digital words in order to determine the presence of a positive match therebetween, thereby to enable high speed comparison of the coarse biometric signatures.

18. The method of claim 17 wherein step (f) includes producing a visual display of images of refined biometric signatures for visual examination by said human operator to determine the presence of a definitive match.

19. The method of claim 18 wherein said visual display includes a pair of facial images, and wherein the coarse biometric signatures compared in accordance with step (d) are representations of several coarse biometric characteristics of persons matched, at least some of which are selected from the group consisting of sex, age, eye color, hair color, complexion, height, weight, facial feature parameters, slant of handwriting and handwriting readability.

20. A method of employing an electronically controlled data processor for thwarting cheaters from obtaining multiple government benefits comprising the steps of:

(a) inserting refined biometric signatures of approved applicants for said government benefits within a large electronically controlled data bank, which data bank is divided into a plurality of sub-banks, each serving to protect a given protected geographical area;

(b) producing a currently processed refined biometric signature of a particular current applicant for a government benefit;

(c) addressing a particular data sub-bank with said currently processed refined biometric signature of said particular applicant;

(d) comparing said currently processed refined biometric signature of said particular applicant with refined biometric signatures of prior applicants stored within said particular data sub-bank;

(e) producing a definitive positive match signal upon definitive matching of said currently processed refined biometric signature with a refined biometric signature stored within said data sub-bank;

(f) producing an application reject signal in response to the production of said definitive positive match signal;

(g) entering the currently processed refined biometric signature of said particular person under examination which produced said definitive positive match signal in a data sub-bank reject store associated with said particular data sub-bank; and (h) additionally recording said refined biometric signature which produced said definitive positive match signal in other reject stores associated with data sub-banks other than said particular data sub-bank, thereby to tend to prevent said particular applicant from fraudulently obtaining multiple government benefits by applying within geographical areas protected by said other data sub-banks.

21. The method of claim 20 wherein said large data bank receives, in accordance with step (a) refined biometric signatures from issue stations located throughout an entire country and each data sub-bank receives, in accordance with step (c), refined biometric signatures from issue stations located within protected geographical areas representing a substantial fraction of said entire country.

22. A method of employing an electronically controlled data processor for determining whether a currently processed person under examination should be extended a privilege granted by society comprising the steps of:

(a) inserting into said electronically controlled data processor coarse biometric indexes of previously processed persons, each coarse biometric index representing a plurality of various different types of coarse biometric characteristics, and additionally inserting refined biometric signatures of previously processed persons representing refined biometric characteristics which tend to discriminate one person from the other in a more definitive manner than the coarse biometric characteristics;

(b) producing a currently processed coarse biometric index of a currently processed person;

(c) comparing said currently processed coarse biometric index of said currently processed person with numerous coarse biometric indexes of previously processed persons stored within said data processor;

(d) producing coarse biometric index match signals upon matching of said currently processed coarse biometric index with coarse biometric indexes of previously processed persons stored within said data processor;

(e) in response to the production of said coarse biometric index match signals, comparing a refined biometric signature of a currently processed person with refined biometric signatures of those previously processed persons which produced coarse biometric index match signals in accordance with step (d) in order to determine whether said currently processed person is the same person as a previously processed person; and (f) wherein the coarse biometric index compared in accordance with step (c) are each representations of several coarse biometric characteristics of persons being compared, at least some of which are selected from the group consisting of sex, age, eye color, hair color, complexion, height, weight, facial feature ratios, slant of handwriting and handwriting readability.

23. The method of claim 22 wherein said coarse biometric signatures are represented by an index word comprising several sub-indexes and further including the step of reducing, from time to time, the number of sub-indexes effectively compared in accordance with step (c) in order to decrease the number of coarse biometric mismatch signals to in turn increase the number of refined biometric signatures to be examined for examinations of greater importance.

24. The method of claim 22 wherein said coarse biometric signatures are represented by digital words, thereby to enable high speed comparisons of said coarse biometric indexes.

25. The method of claim 22 wherein step (e) includes displaying to a human operator a facial image retrieved from said electronically controlled data processor in accordance with step (e).

26. A method of employing an electronically controlled data processor for determining whether a currently processed person under examination should be extended a privilege granted by society comprising the steps of:

(a) inserting into said electronically controlled data processor coarse biometric indexes of previously processed persons, each coarse biometric index representing a plurality of various different types of coarse biometric characteristics, and additionally inserting refined biometric signatures of previously processed persons representing refined biometric characteristics which tend to discriminate one person from the other in a more definitive manner than the coarse biometric characteristics;

(b) producing a currently processed coarse biometric index of a currently processed person;

(c) comparing said currently processed coarse biometric index of said currently processed person with numerous coarse biometric indexes of previously processed persons stored within said data processor;

(d) producing coarse biometric index match signals upon matching of said currently processed coarse biometric index with coarse biometric indexes of previously processed persons stored within said data processor;

(e) in response to the production of said coarse biometric index match signals, comparing a refined biometric signature of a currently processed person with refined biometric signatures of those previously processed persons which produced coarse biometric index match signals in accordance with step (d) in order to determine whether said currently processed person is the same person as a previously processed person; and (f) wherein said coarse biometric indexes are represented by an index word comprising several sub-indexes and further including the step of reducing, from time to time, the number of sub-indexes effectively compared in accordance with step (c) in order to decrease the number of coarse biometric mismatch signals to in turn increase the number of refined biometric signatures to be examined for examinations of greater importance.

27. The method of claim 26 wherein said coarse biometric signatures are represented by digital words, thereby to enable high speed comparisons of said coarse biometric indexes.

28. The method of claim 26 wherein step (e) includes displaying to a human operator a facial image retrieved from said electronically controlled data processor in accordance with step (e).

29. A method of employing an electronically controlled data processor for determining whether a currently processed person under examination should be extended a privilege granted by society comprising the steps of:

(a) inserting into said electronically controlled data processor coarse biometric indexes of previously processed persons, each coarse biometric index representing a plurality of various different types of coarse biometric characteristics, and additionally inserting refined biometric signatures of previously processed persons representing refined biometric characteristics which tend to discriminate one person from the other in a more definitive manner than the coarse biometric characteristics;

(b) producing a currently processed coarse biometric index of a currently processed person;

(c) comparing said currently processed coarse biometric index of said currently processed person with numerous coarse biometric indexes of previously processed persons stored within said data processor;

(d) producing coarse biometric index match signals upon matching of said currently processed coarse biometric index with coarse biometric indexes of previously processed persons stored within said data processor;

(e) in response to the production of said coarse biometric index match signals, comparing a refined biometric signature of a currently processed person with refined biometric signatures of those previously processed persons which produced coarse biometric index match signals in accordance with step (d) in order to determine whether said currently processed person is the same person as a previously processed person; and (f) wherein step (e) is carried out by human visual inspection; and wherein said coarse biometric indexes are represented by an index word comprising several sub-indexes and further including the step of reducing, from time to time, the number of sub-indexes effectively compared in accordance with step (c) in order to decrease the number of coarse biometric mismatch signals to in turn increase the number of refined biometric signatures to be examined for examinations of greater importance.

30. The method of claim 24 wherein step (e) includes displaying to a human operator a facial image retrieved from said electronically controlled data processor in accordance with step (e).

* * * * *